US008197208B2

(12) United States Patent
Sharples et al.

(10) Patent No.: US 8,197,208 B2
(45) Date of Patent: Jun. 12, 2012

(54) FLOATING UNDERWATER SUPPORT STRUCTURE

(75) Inventors: William G. Sharples, San Francisco, CA (US); Christopher H. Tracy, Cambridge, MA (US)

(73) Assignee: Clear Path Energy, LLC, Wilmington, DE (US)

( * ) Notice: Subject to any disclaimer, the term of this patent is extended or adjusted under 35 U.S.C. 154(b) by 0 days.

(21) Appl. No.: 12/968,614

(22) Filed: Dec. 15, 2010

(65) Prior Publication Data
US 2011/0142683 A1 Jun. 16, 2011

Related U.S. Application Data

(60) Provisional application No. 61/287,157, filed on Dec. 16, 2009, provisional application No. 61/314,146, filed on Mar. 15, 2010.

(51) Int. Cl.
*B63H 1/38* (2006.01)
(52) U.S. Cl. .............. 416/85; 415/7; 52/652.1
(58) Field of Classification Search ........ 415/7; 416/85, 416/86; 52/652.1, 653.1, 633
See application file for complete search history.

(56) References Cited

U.S. PATENT DOCUMENTS

| | | | |
|---|---|---|---|
| 2,177,801 A | | 10/1939 | Erren |
| 3,111,692 A | * | 11/1963 | Cox .............................. 114/264 |
| 3,736,756 A | * | 6/1973 | Lloyd ........................... 405/204 |
| 3,789,252 A | | 1/1974 | Abegg |
| 4,437,794 A | * | 3/1984 | Grimsley et al. ............. 405/224 |
| 4,449,889 A | | 5/1984 | Belden |
| 4,481,899 A | | 11/1984 | Einstabland |
| 5,599,168 A | | 2/1997 | Lund |
| 6,064,123 A | | 5/2000 | Gislason |
| 6,177,735 B1 | | 1/2001 | Chapman et al. |
| 6,431,107 B1 | * | 8/2002 | Byle ............................. 114/264 |
| 6,492,756 B1 | | 12/2002 | Maslov et al. |
| 6,664,655 B2 | | 12/2003 | Vann |
| 6,727,600 B1 | | 4/2004 | Abdurachmanov |

(Continued)

FOREIGN PATENT DOCUMENTS
WO 2009016372 2/2009

OTHER PUBLICATIONS

"The Most Amazing Windmills in the World," Internet. Available at http://www.mywindpowersystem.com/2009/05/the-most-amazing-wind-turbines-designs/. May 2009. Last visited Oct. 6, 2010.

(Continued)

*Primary Examiner* — Edward Look
*Assistant Examiner* — Andrew C Knopp
(74) *Attorney, Agent, or Firm* — PatentBest; Andrew McAleavey

(57) ABSTRACT

A floating underwater support structure is disclosed. The underwater support structure includes a joint capable of rotation and angular movement along two or three axes coupled to a truss. The truss is capable of sustaining loads in tension, compression, and bending, and comprises one or more elongate, rigid members. The elongate, rigid members are capable of sustaining loads in at least tension and compression. A buoyant member positioned between or around the members of the truss at a predetermined distance below the water provides a buoyant force that typically exceeds the weight of the entire structure. In deeper water, cross bracing may be provided between the members of the truss, and in particularly deep water, a single tendon may connect between the joint, typically anchored to the floor of the body of water, and the truss. The support structure may be used to support wind turbines and other structures.

21 Claims, 10 Drawing Sheets

U.S. PATENT DOCUMENTS

| | | |
|---|---|---|
| 6,759,758 B2 | 7/2004 | Torres Martinez |
| 6,931,812 B1 * | 8/2005 | Lipscomb .................... 52/653.1 |
| 7,042,109 B2 | 5/2006 | Gabrys |
| 7,075,189 B2 * | 7/2006 | Heronemus et al. ............ 290/44 |
| 7,154,191 B2 | 12/2006 | Jansen |
| 7,156,037 B2 | 1/2007 | Borgen |
| 7,156,586 B2 | 1/2007 | Nim |
| 7,180,204 B2 | 2/2007 | Grant |
| 7,183,665 B2 | 2/2007 | Bywaters |
| 7,202,584 B2 | 4/2007 | Ida |
| 7,204,673 B2 | 4/2007 | Wobben |
| 7,293,960 B2 | 11/2007 | Yamamoto et al. |
| 7,296,971 B2 * | 11/2007 | Borgen ............................ 416/85 |
| 7,315,102 B2 | 1/2008 | Minagawa |
| 7,355,309 B2 | 4/2008 | Costin |
| 7,456,515 B2 | 11/2008 | Nielsen |
| 7,456,534 B2 | 11/2008 | Engstrom |
| 7,482,720 B2 | 1/2009 | Gordon |
| 7,579,744 B2 | 8/2009 | Kato |
| 7,612,462 B2 | 11/2009 | Viterna |
| 7,646,132 B2 | 1/2010 | Halstead |
| 7,687,932 B2 | 3/2010 | Casazza |
| 7,709,971 B2 | 5/2010 | Sane |
| 8,057,127 B2 * | 11/2011 | Lopez et al. .................. 405/224 |
| 2004/0105724 A1 | 6/2004 | Copple |
| 2004/0169376 A1 | 9/2004 | Ruer |
| 2005/0126106 A1 * | 6/2005 | Murphy et al. .............. 52/652.1 |
| 2005/0155346 A1 | 7/2005 | Nikolaus |
| 2006/0062676 A1 | 3/2006 | Jakubowski |
| 2006/0269362 A1 | 11/2006 | Henriksen |
| 2007/0036657 A1 | 2/2007 | Wobben |
| 2007/0207028 A1 | 9/2007 | Nicholas |
| 2009/0205554 A1 | 8/2009 | Srinivasan |
| 2011/0200425 A1 * | 8/2011 | Weaver ............................ 415/7 |

OTHER PUBLICATIONS

"History: MOD-2/MOD-5B Wind Turbines," Internet. Available at http://www.boeing.com/history/boeing/windturbine.html. Last visited Dec. 14, 2010.

International Search Report and Written Opinion of the ISA for PCT/US2010/060589, dated Aug. 30, 2011.

\* cited by examiner

FLOATING UNDERWATER SUPPORT STRUCTURE

CROSS-REFERENCE TO RELATED APPLICATIONS

This patent application claims priority to U.S. Provisional Patent Application No. 61/287,157, filed Dec. 16, 2009, and to U.S. Provisional Patent Application No. 61/314,146, filed Mar. 15, 2010. The contents of both of those applications are hereby incorporated by reference in their entireties.

BACKGROUND OF THE INVENTION

1. Field of the Invention

The invention relates to floating underwater support structures that can support structures placed above or on the surface of a body of water, and can maintain a stable, substantially upright orientation in shallow and deep water.

2. Description of Related Art

Many processes, including various types of energy exploration and production, require that a floating structure be placed permanently or semi-permanently in a body of water. The manner in which these floating structures are placed and supported depends on the weight and size of the structure, the depth of the water, the wind and sea conditions at the site, and other such considerations.

For heavy equipment that is to be located in deep water, the tension leg platform (TLP) is one conventional solution. In a TLP, a platform above the surface of the water is rigidly attached to a buoyant member located below the surface of the water. The buoyant member, in turn, is anchored by one or more tension cables, also called tension legs, that are tethered to seabed anchors. The buoyant force provided by the submerged buoyant member maintains the tension legs in tension. TLPs have long been used, for example, to support oil production platforms in deep water.

Despite their uses, TLPs have certain disadvantages. Because a TLP's center of buoyancy is typically below the structure's center of gravity, the structure tends to capsize without tension in the tension legs. This is not typically a problem in deep water, where the structure can be designed to minimize the influence of the waves and maintain tension in the legs. However, if a TLP is placed in shallow water, it is more affected by wave loads, which could introduce compression into the tension legs and risk capsizing the TLP.

Thus, TLPs are not ideal for supporting lighter structures, such as wind turbines, that are to be placed closer to shore in shallow or moderately deep water. Unfortunately, other solutions for supporting lighter structures in shallow and moderately deep water are relatively few. Moreover, support structures that work well in shallow water are often hard to implement in deeper water, and as with TLPs, support structures intended for deeper water often do not work well in shallow water. For example, a spar buoy (i.e., a tall, slender floating structure) has too large a draft to function in shallow water.

One approach for supporting a structure such as a wind turbine in shallow or moderately deep water is to use a structure that relies on a large surface area to float on the surface of the water, much in the way that a conventional ship floats. However, that approach often results in a structure that is large and heavy. Another approach is to build a platform or support with rigid legs that reach all the way to the sea floor, but that approach may only be feasible in relatively shallow water.

Ultimately, the lack of good solutions for supporting floating structures has resulted in structures like wind turbines being placed primarily in shallow water (e.g., 35 m or less). There are a few prototype structures for supporting wind turbines in deep water (e.g., 200 m or more). There are a limited number of economically and technically feasible choices for supporting wind turbines and other structures in water that is, for example, 35-200 m deep, yet there are many otherwise suitable sites with water depths in that range.

SUMMARY OF THE INVENTION

One aspect of the invention relates to a floating underwater support structure. The floating underwater support structure comprises a joint, a truss structure, and a buoyant member. The joint is anchored to a floor of a body of water, and is capable of angular movement in two or three axes. The truss structure is coupled to the joint, extends upwardly from it, is capable of sustaining loads in tension, compression, and bending, and comprises one or more elongate, rigid members. The elongate, rigid members are capable of sustaining loads in at least tension and compression. The buoyant member is arranged between or around the one or more members and supplies a buoyant force greater than the weight of the floating underwater support structure. The buoyant member and the truss structure are proportioned and arranged relative to one another such that the top of the buoyant member rests a predefined distance below water level.

Another aspect of the invention relates to a floating structure. The floating structure comprises a floating underwater support structure and an above-water structure. The floating underwater support structure comprises a joint, a truss structure, and a buoyant member. The joint is anchored to a floor of a body of water, and is capable of angular movement in two or three axes. The truss structure is coupled to the joint, extends upwardly from it, is capable of sustaining loads in tension, compression, and bending, and comprises three or more elongate rigid members, arranged in the shape of an inverted pyramid or frustum. The elongate, rigid members are capable of sustaining loads in at least tension and compression. The buoyant member is arranged between or around the three or more members and supplies a buoyant force greater than the weight of the entire structure. The buoyant member and the truss structure are proportioned and arranged relative to one another such that the top of the buoyant member rests a predefined distance below water level. The above-water structure includes three or more above-water members connected to the three or more members of the floating underwater support structure. In some embodiments, the above-water members may form a generally pyramidal tower. The tower may used as a meteorological tower, a navigational aid, a communication tower, a base for tethered or free flying craft, or a support for a wind turbine.

Yet another aspect of the invention relates to a floating, wind energy generating structure. The floating structure comprises a floating underwater support structure and a wind turbine. The floating underwater support structure comprises a joint, a truss structure, and a buoyant member. The joint is anchored to a floor of a body of water, and is capable angular movement in two or three axes. The truss structure is coupled to the joint, extends upwardly from it, is capable of sustaining loads in tension, compression, and bending, and comprises three or more elongate rigid members, arranged in the shape of an inverted pyramid or frustum. The elongate, rigid members are capable of sustaining loads in at least tension and compression. The buoyant member is arranged between or around the three or more members and supplies a buoyant force greater than the weight of the entire structure. The buoyant member and the truss structure are proportioned and arranged relative to one another such that the top of the buoyant member rests a predefined distance below water level. The wind turbine includes three or more above-water members connected to the members of the floating underwater structure, an axle defined on or by at least one of the above-water members, a hub mounted for rotation on the axle, two or more blades mounted on the hub, and a generator. The blades are constructed and arranged to translate forces exerted by the wind into rotation of the hub. The generator is mounted on or coupled to the hub to convert rotation of the hub into electrical energy.

These and other aspects, features, and advantages of the invention will be set forth in the description that follows.

BRIEF DESCRIPTION OF THE DRAWING FIGURES

The invention will be described with respect to the following drawing figures, in which like numerals represent like features throughout the figures, and in which.

DETAILED DESCRIPTION

Figure 1:
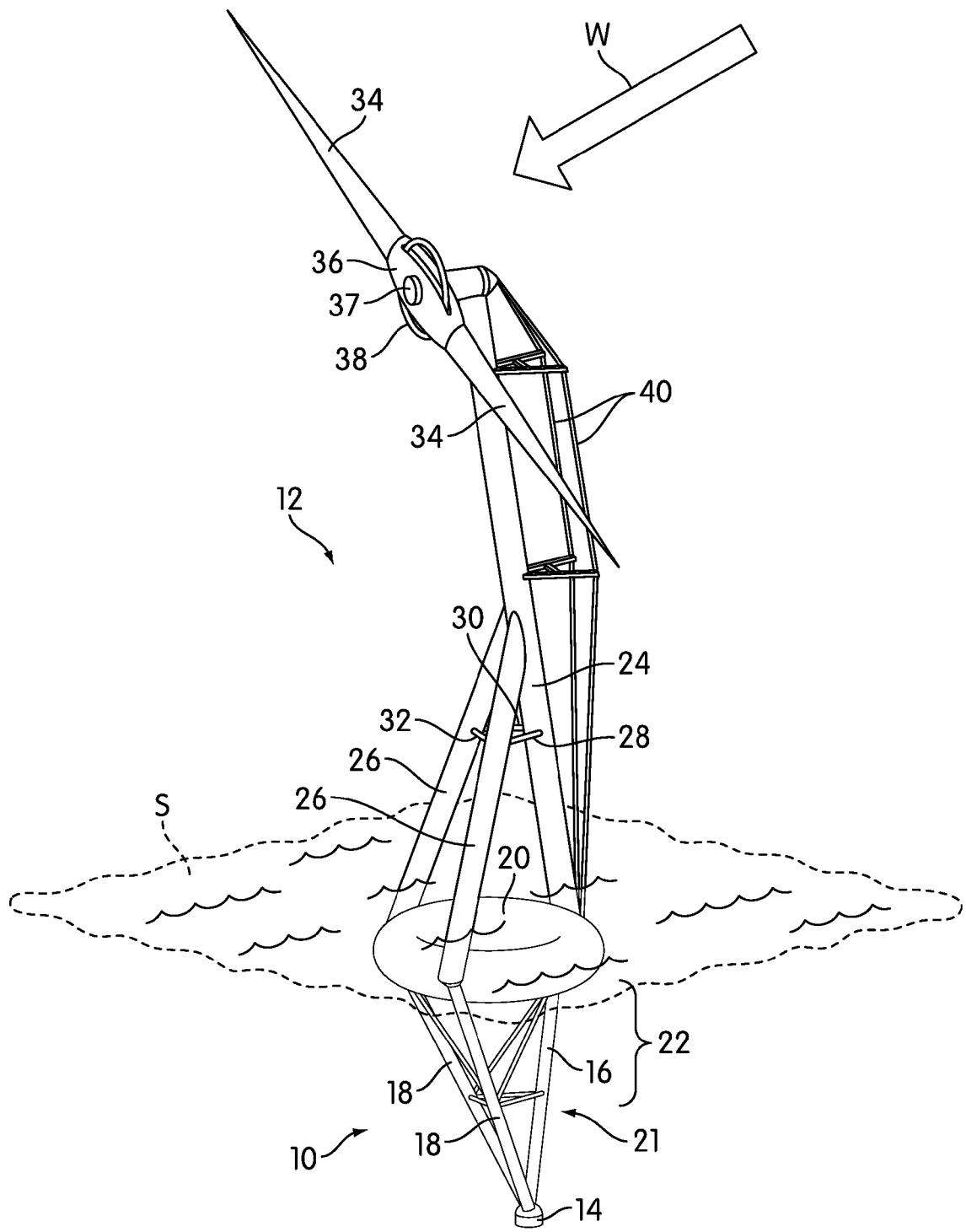
FIG. 1 is a perspective view of a floating underwater support structure according to one embodiment of the invention supporting a wind turbine.

FIG. 1 is a perspective view of a floating underwater support structure, generally indicated at 10, according to one embodiment of the invention. In the view of FIG. 1, the floating underwater support structure 10 is shown supporting a wind turbine 12. In the following description, certain aspects and advantages of the floating underwater support structure 10 will be described with respect to its use with wind turbines, although as will be described below, the floating underwater support structure 10 may be used to support a variety of structures.

The floating underwater support structure 10 is anchored to the floor of a body of water. (In certain portions of this description, the terms "sea floor" and "seabed" may be used interchangeably and also refer generally to the floor of a body of water.) The anchor mechanism 14 that anchors the support structure 10 allows rotation and angular movement in at least two axes of motion (i.e., it allows at least two of pitch, roll, and yaw). In some embodiments, anchor mechanisms according to embodiments of the invention may not include the ability to rotate. Other embodiments may include the ability to rotate and to move angularly in all three axes of angular motion. The nature of the movements of which the anchor mechanism 14 is capable will depend in large part on the nature of the above-water structure that it is to support.

Figure 2:
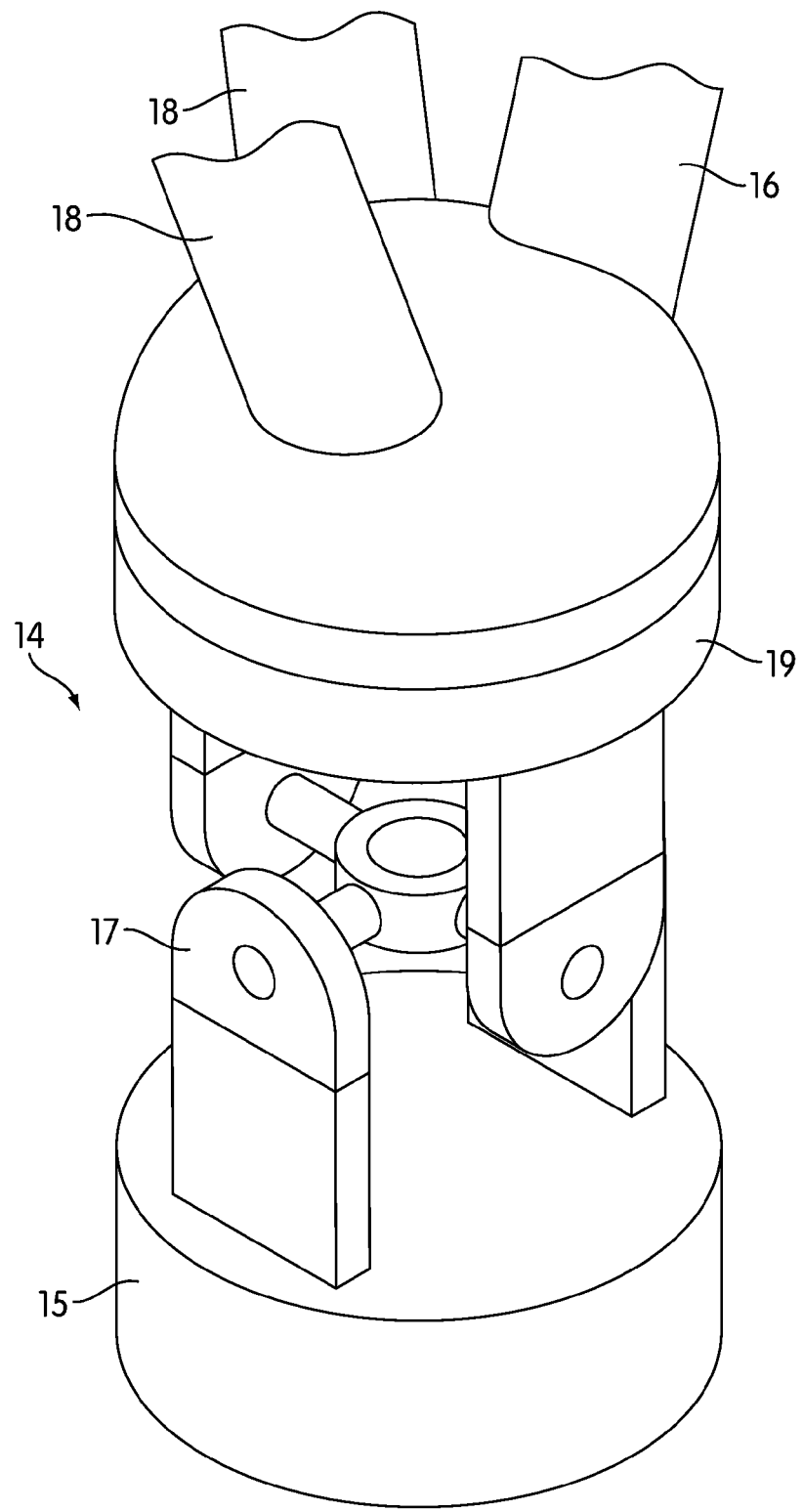
FIG. 2 is a perspective view of a seafloor swivel used in the floating underwater support structure of FIG. 1.

FIG. 2 is a perspective view of the anchor mechanism 14 in isolation. As shown in FIG. 2, the anchor mechanism 14 includes a base 15 that is anchored into the seabed, a universal joint 17, and a rotational bearing 19 installed atop the universal joint 17. In other embodiments, the stacking order of those components may be reversed and a rotational bearing 19 may be placed beneath the universal joint 17, or the rotational bearing 19 may be omitted entirely. Other types of joints and bearings may be used, so long as the resulting anchor mechanism is capable of allowing movement in any necessary directions or along any necessary axes. For example, in some embodiments, ball and socket joints may be used. Of course, different applications may require different types of movement in the anchor mechanism 14. Generally speaking, an anchor mechanism 14 in an embodiment of the present invention may provide 360° of yaw rotation and about ±45° of rotation in each of pitch and roll (about 90° total angular range of motion), although other ranges of motion are possible, depending on the nature of the structure that is to be supported and the nature of the body of water on which it is to be supported.

Connected to and rising from the anchor mechanism 14 is a truss structure 21. In the illustrated embodiment, the truss structure 21 comprises a fore leg 16 and two aft legs 18, although in other embodiments, the truss structure may have more or fewer members. The legs 16, 18 are best seen in the perspective view of FIG. 1. In the following description, the "fore" or "forward" leg 16 is the leading member that is constructed and arranged to face into the wind; the "aft" members are behind the fore member. For convenience, in the view of FIG. 1, the arrow W designates the direction of the wind. Moreover, as will be described below in more detail, particularly when used with the wind turbine 12, the floating underwater support structure 10 is designed to orient itself so that its fore leg 16 is facing into the wind.

The shape of the truss 21 is generally that of an inverted pyramid or frustum. The term "frustum" generally refers to the portion of a pyramid that remains once the pyramid is cut by two parallel planes, although for purposes of the present invention, the planes (and any connector plate) may be parallel or substantially parallel. In other words, although the truss 21 of the illustrated embodiment has the general shape of an inverted pyramid, the truss 21 need not reach an apex. Instead, the three legs 16, 18 may be connected to a plate and that plate may be coupled to the anchor mechanism 14 through that plate.

The fore leg 16 and aft legs 18 are tension-compression members that are capable of sustaining at least tensile and compressive loads. Thus, the truss structure 21 and its main support members 16, 18 can sustain tensile and compressive loads and bending moments, although compressive loads are not likely to be encountered in most applications. Moreover, as will be described below in more detail, in some embodiments, the truss 21 may be connected to the anchor mechanism 14 indirectly by way of a tendon or other structure that is only capable of sustaining tensile loads.

In the illustrated embodiment, the legs 16, 18 are metal tubes with round cross-sections, although in some embodiments, the legs 16, 18 may have an ellipsoid or other non-round cross-section. The diameter and wall thickness of the legs 16, 18 may vary from embodiment to embodiment, depending on the location in which the floating underwater support structure 10 is to be installed, the type of structure it is to support, the depth of the water, and the forces that it is expected to encounter. In at least some embodiments, the fore leg 16, which faces into the wind, may have a greater diameter and wall thickness than the two aft legs 18. As one example, supporting a wind turbine such as wind turbine 12, the foreleg 16 may have a diameter of about 1 meter, with a wall thickness about 10% of its radius. The aft legs 18 may have diameters that are about 10-20% smaller than the fore leg 16.

Depending on the depth of the water in which the floating underwater support structure 10 is to be installed, the support structure 10 may have a number of cross-bracing members, indicated collectively at 22 in FIG. 1. The cross-bracing members 22 may help the truss 21 to resist bending moments. The number and arrangement of cross-bracing members 22 will vary depending on the water depth, typically with more cross-bracing members 22 for deeper depths of water. Particular considerations for different depths of water will be described below in more detail. One advantage of the floating underwater support structure 10 shown in FIG. 1 is that it can handle or react loads and bending moments within its structure without transferring them entirely to the anchor mechanism 14.

Typically, the legs 16, 18 and cross-bracing members 22 would be made of a metal such as steel, although other metals may be used. Other materials that can bear tension and compression loads, such as reinforced concrete and composites, may also be used. Conventional anti-corrosion coatings and techniques may be used on the floating underwater support structure 10 as necessary to prevent corrosion or other effects from water and sea exposure.

Located between the three legs 16, 18 a few meters below the sea level S is a buoyant member 20. The buoyant member 20 of the illustrated embodiment has the shape of a torus. Other shapes and configurations may be used for the buoyant member 20, although it is advantageous if the shape of the buoyant member 20 is at least somewhat symmetrical in order to mitigate the effects of currents. In other embodiments, the buoyant member 20 may be spherical, a disc, or an ellipsoid, to name a few possible shapes. The buoyant member 20 may be several meters in diameter (e.g., 8 m) and may be placed at a depth of about 5-10 m below sea level S. For example, in the illustrated embodiment of FIG. 1, the buoyant member 20 may be placed at a depth of about 7 m below sea level S. However, in a location with particularly calm seas, such as a lake, the buoyant member 20 could be located closer to the surface.

Generally, the amount of buoyancy produced by the buoyant member 20 will be sufficient to exceed the weight of the entire structure, such that the structure will right itself after a pitching, rolling, or yawing movement caused by wind or waves. In some cases, ballast may be placed at the bottom of the structure on top of or near the anchor mechanism 14.

A description of the wind turbine 12 may be helpful in understanding some of the features and advantages of the floating underwater support structure 10, as well as the type and range of structures it can support. The wind turbine 12 has a primary support member 24 that is directly connected to the fore leg 16 of the floating underwater support structure 10. Two secondary support members 26 of smaller diameter and dimension join the primary support member 24 at approximately its midpoint to form a tripod-like support structure. The secondary support members 26 are directly connected to the aft legs 18 of the floating underwater support structure 10.

In other embodiments, structures could be mounted on the floating underwater support structure 10 at other locations. For example, structures could be mounted directly to the buoyant member 20. However, attaching the above-sea structure directly to the main legs 16, 18 of the floating underwater support structure 10 adds an element of structural rigidity. If structures were to be mounted on the buoyant member 20, the buoyant member 20 would need to be strengthened or rigidified to sustain the load.

Similarly, the presence and positioning of the secondary support members 26 and their connection to the aft legs 18 of the floating underwater support structure 10 is intended to add additional rigidity to the entire structure. In most embodiments, the floating underwater support structure 10 will have a number of distinct members that comprise its truss 21, and the structure it supports will have a matching number of support members connected to the members of the underwater support structure 10. For example, if the floating underwater support structure 10 has three legs or members, the structure it supports will also have three, if it has four members, the structure it supports will have four, and so forth. However, that need not always be the case. In some embodiments, the floating underwater support structure 10 could support a platform on which the above-water structure is mounted. In other embodiments, the above-water structure may simply have fewer support members than the underwater support structure.

A generally triangular set of cross braces 28, 30, 32 braces the primary and secondary support members 24, 26 of the wind turbine 12. At the top of the primary support member 24, blades 34 are mounted to a rotating hub structure 36. The hub structure 36 is mounted for rotation on an axle 37. There are two blades 34 in the illustrated embodiment, although more blades 34 may be used in other embodiments. The primary support member 24 and blades 34 are arranged so that the wind turbine 12 is a downwind turbine; in other words, the wind W hits the primary support member 24 before the blades 34. This arrangement allows the wind turbine 12 to self-orient to the wind, mounted as it is on the floating underwater support structure 10 with its anchor mechanism 14.

The wind turbine 12 may carry any sort of electrical generator to convert the energy of the turning blades 34 into electrical energy, and many different types of suitable generators are known in the art. In the illustrated embodiment, the wind turbine 12 carries a direct drive generator 38, sometimes known as a ring generator. The primary distinguishing feature of a direct drive generator is that it includes no gearbox to step up the rotational speed of the generator shaft. Thus, direct drive generators 38 rotate at the same rate as the blades 34 themselves and are relatively large, often on the order of several meters in diameter, in order to generate enough electricity from the motion of the blades 34.

If a direct drive generator is used in the wind turbine 12, it may be a radial gap direct drive generator, or it may be an axial gap direct drive generator, as described in commonly-assigned, co-pending U.S. Patent Application of William G. Sharples et al., entitled "Axial Gap Rotating Electrical Machine," which is incorporated by reference herein in its entirety.

A number of tension cable supports 40 are attached on one end to the primary support member 24 and on the other end to the axle 37. In operation, the wind loads will create axial load on the axle 37, which will be transmitted through the axle 37 to the primary support member 24. The tension cable supports 40 provide additional support to the primary support member 24 by counteracting those bending moments.

In the embodiment illustrated in FIG. 1, the axle 37 is fixed in position with respect to the primary support member 24. In some embodiments, however, the axle 37 may be connected to the primary support member 24 by way of a hinge or pivot that would allow the axle 37, hub 36, and blades 34 to move relative to the primary support member 24. This movement may be passive and dependent on the wind, or it may be actively controlled by sensors and motors coupled to the hinge or pivot and to the wind turbine 12 in general. The inclusion of such a hinge would particularly allow the blades 34 to rotate in the vertical plane and present the greatest swept area to the wind without affecting the position of the primary support member 24 or the floating underwater structure 10.

In the illustrated embodiment, the wind turbine 12 is a downwind turbine. However, particularly if the angle of attack of the blades 34 is controlled, the wind turbine 12 could be an upwind turbine that can self-orient to the wind. In other embodiments, a yaw bearing may be placed under the wind turbine 12, particularly if the anchor mechanism 14 comprises only a universal joint with no rotational bearing or joint.

The floating underwater support structure 10 is adapted to support the wind turbine 12 in an upright, or substantially upright, position notwithstanding the range of loads experienced at the top of the structure that would otherwise tend to cause it to capsize. For example, in the illustrated embodiments, the legs 16, 18 are not oriented or angled so that the floating underwater support structure 10 is perfectly symmetrical or vertical. Instead, the legs 16, 18 are canted or angled slightly in a direction that is the opposite of the direction of the expected loads. For example, given the arrangement of FIG. 1, one would expect the wind W, applied in the fore-to-aft direction, to tilt the turbine 12 and the floating underwater support structure 10 aftward. Therefore, the legs 16, 18 are canted slightly in the forward direction, such that under load, the forward cant will at least partially cancel the aftward tilt, leaving the wind turbine 12 substantially upright in the wind W, or at least more upright than it would be without the forward cant.

This asymmetry or cant, if present, may be relatively small. For example, in a floating underwater support structure 10 designed for 50 m water depth with a buoyant member having a radius of 8 m, the location of the anchor mechanism may be offset 4-5 m in the forward direction, if an aftward load is expected.

Figure 3:
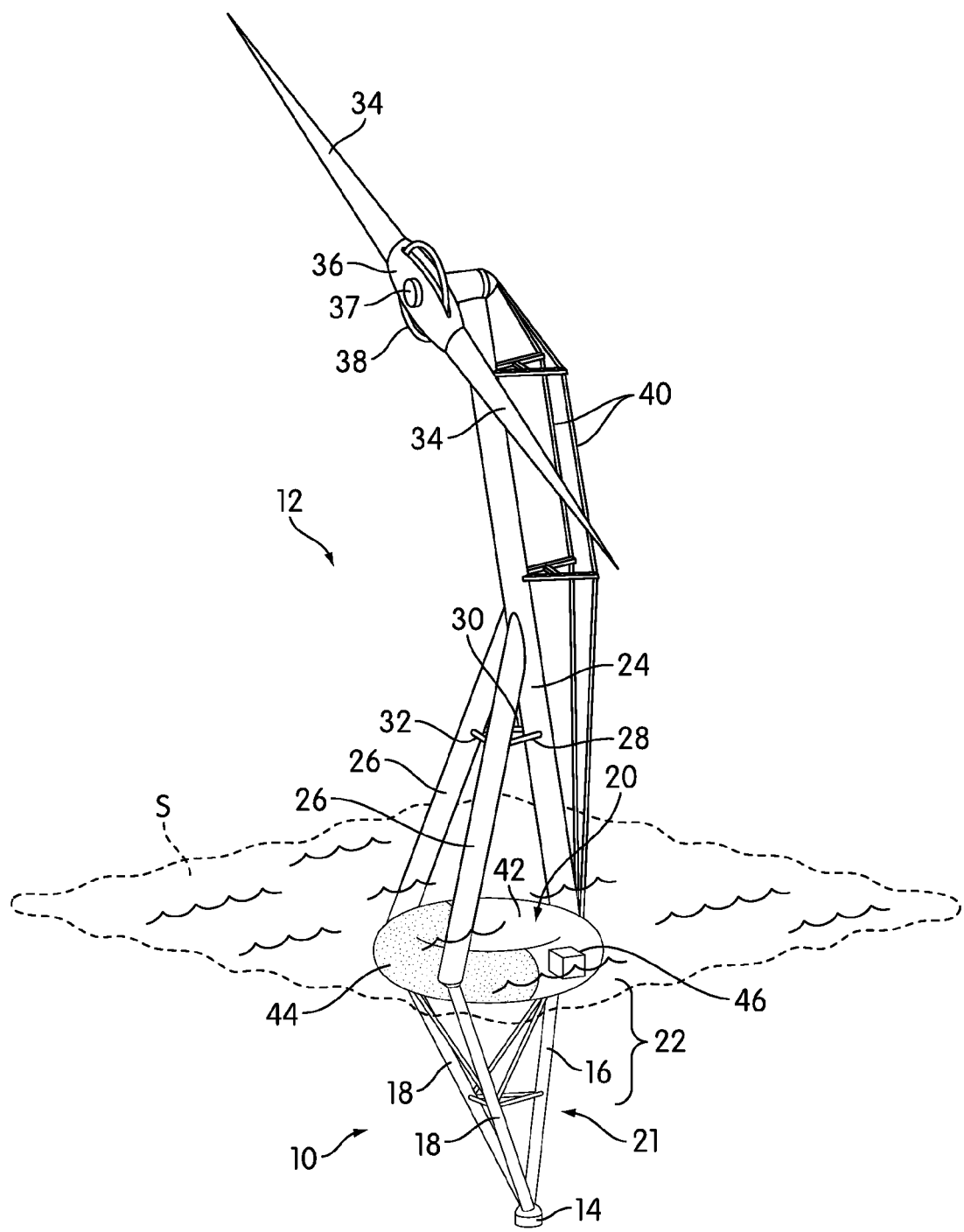
FIG. 3 is a perspective view of the floating underwater support structure of FIG. 1 illustrating an aft portion of the buoyant member filled with water to offset light or no wind loads on the wind turbine.

Whether or not the legs 16, 18 are canted or arranged asymmetrically, the buoyant member 20 may be adapted to assist in maintaining a structure in a substantially upright position. Specifically, in some embodiments, the buoyant member 20 may be divided into two or more compartments, at least some of which may be selectively flooded to counteract pitch or roll moments. FIG. 3 is a perspective view of the floating underwater support structure 10 and the wind turbine 12 similar to the view of FIG. 1. In the view of FIG. 3, the buoyant member 20 is divided into two compartments, a forward compartment 42 and an aft compartment 44. The aft compartment 44 is shown as being flooded.

In general, the buoyant member 20 may be divided into any number of compartments, and those compartments may be constructed and arranged to be selectively flooded with water using a system of pumps and valves (not shown in the figures). FIG. 3 illustrates one example of how this would be used. In FIG. 3, no wind is being applied to the wind turbine 12. In that situation, especially with the legs 16, 18 canted forwardly, the wind turbine 12 would tend to tip forwardly. Filling the aft compartment or compartments with water will cause the buoyant member 12 to sink slightly in the aftward direction, thus counteracting the natural tipping that might otherwise occur. The pump and control system 46 may be coupled to an anemometer, a tilt sensor, or another such device, and may be configured to automatically fill or drain one or more compartments of the buoyant member 20 if tilt is indicated.

The buoyancy control effected by flooding selected compartments within the buoyant member 20 may also be used to help orient a wind turbine to the wind. This would be particularly useful in cases where there is initially no wind or a very light wind but the wind is expected to increase. In those cases, it is generally desirable to have a downwind turbine leaning toward the generator side, such that the blades are as far behind the center of buoyancy as possible. The structure can be made to lean by flooding the aft compartment of the buoyancy member 20 (below the generator). As the wind picks up, the blades 34 would act like a weather vane, rotating the structure to keep the blades 34 downwind of the primary support structure 24. As the thrust generated by the wind turbine increases, the buoyant member 20 would be emptied to reduce the ballast. Conventional techniques for controlling the pitch or profile of the blades 34 would then be used to keep the turbine oriented downwind.

As an alternative to using the surrounding water as a liquid ballast, the buoyant member 20 may also be provided with a mobile ballast (e.g., a large weight, either solid or a shell filled with liquid, mounted so as to roll or slide along a track). In either case, it is advantageous to arrange the buoyant member 20 so that a significant portion of the ballast can be located a large radial distance away from the axis connecting the hub 36 to the anchor mechanism 14. A larger radial distance between that vertical axis allows larger pitch or roll moments to be counteracted for a given amount of water or solid ballast.

FIG. 3 also illustrates another advantage of the buoyant member 20. In many embodiments, the buoyant member will be relatively large. Therefore, the buoyant member may optionally be used to hold or carry components or systems, either of the floating underwater support structure 10 or of whatever structure is mounted to it. For example, in addition to its own pumps and control system for flooding compartments 46, a buoyant member 20 may be used to house a transformer, an inverter, and a control system for a wind turbine. It may also be used as a submarine access point, which may be particularly useful during rough weather.

FIGS. 4-8 illustrate embodiments of the floating underwater support structure 10 for different water depths. In FIGS. 4-8, those parts not specifically described may be assumed to be substantially similar to the parts of the floating underwater support structure 10 of FIGS. 1-3.

Figure 4:
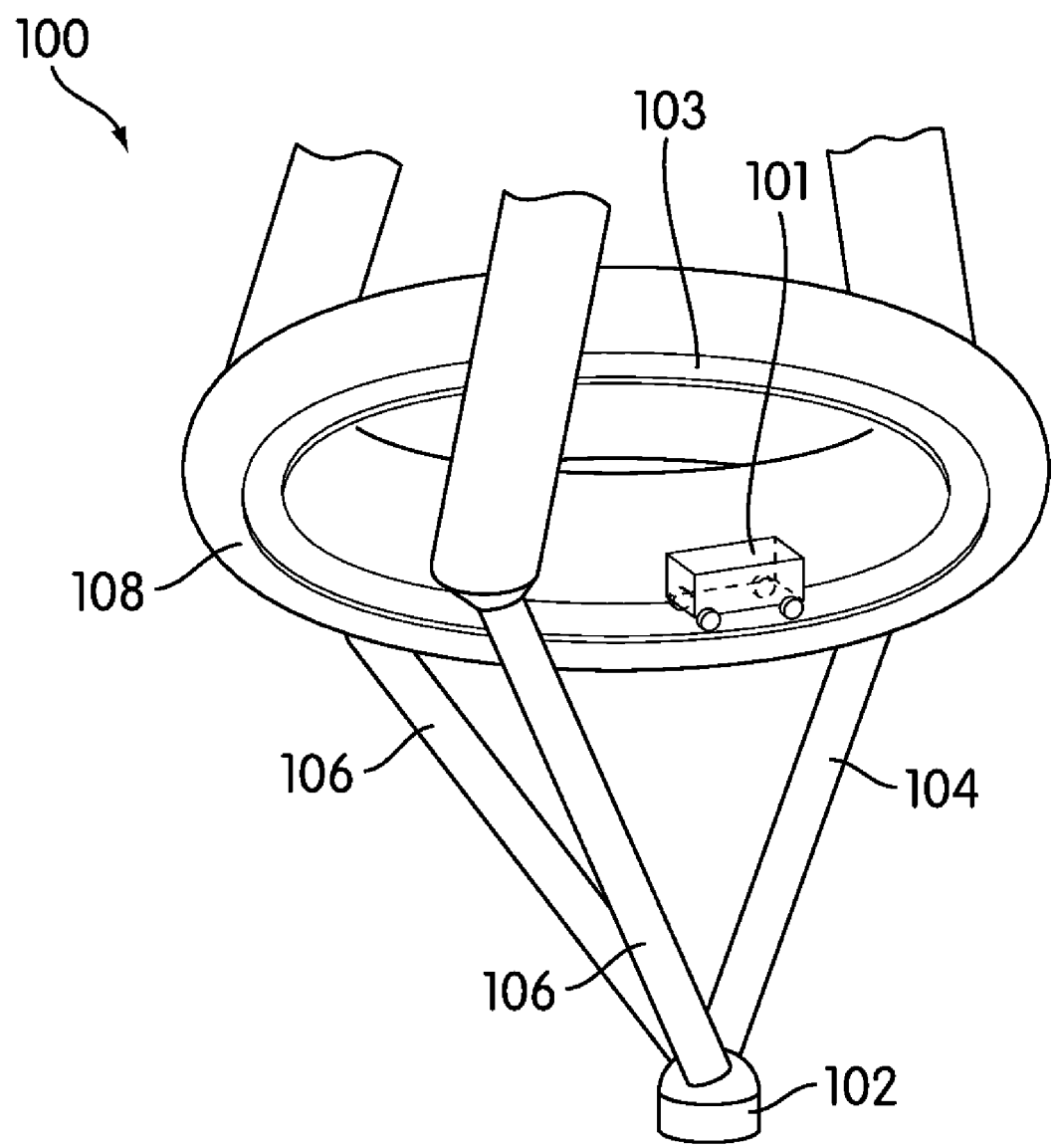
FIG. 4 is a perspective view of an embodiment of a floating underwater support structure for shallow water.

FIG. 4 is a perspective view of a floating underwater support structure 100 that is intended for particularly shallow water depths, for example, on the order of 30 m. The floating underwater support structure 100 includes an anchor mechanism 102, from which arise three legs, a fore leg 104 and two aft legs 106. Between the legs, and positioned 5-10 m (e.g., approximately 7 m) below the surface, is a buoyant member 108. FIG. 4 also illustrates a mobile ballast 101 mounted so as to roll or slide along a track 103, as described above.

The primary difference between the floating underwater support structure 10 of FIGS. 1-3 and the floating underwater support structure 100 of FIG. 4 is that, aside from shorter legs 104, 106 sized for the shallower water, the floating underwater support structure 100 does not include cross-bracing 22. In some embodiments, particularly in areas where rough seas are expected, some form of cross bracing may be provided; however, it is not necessary in all embodiments.

Figure 5:
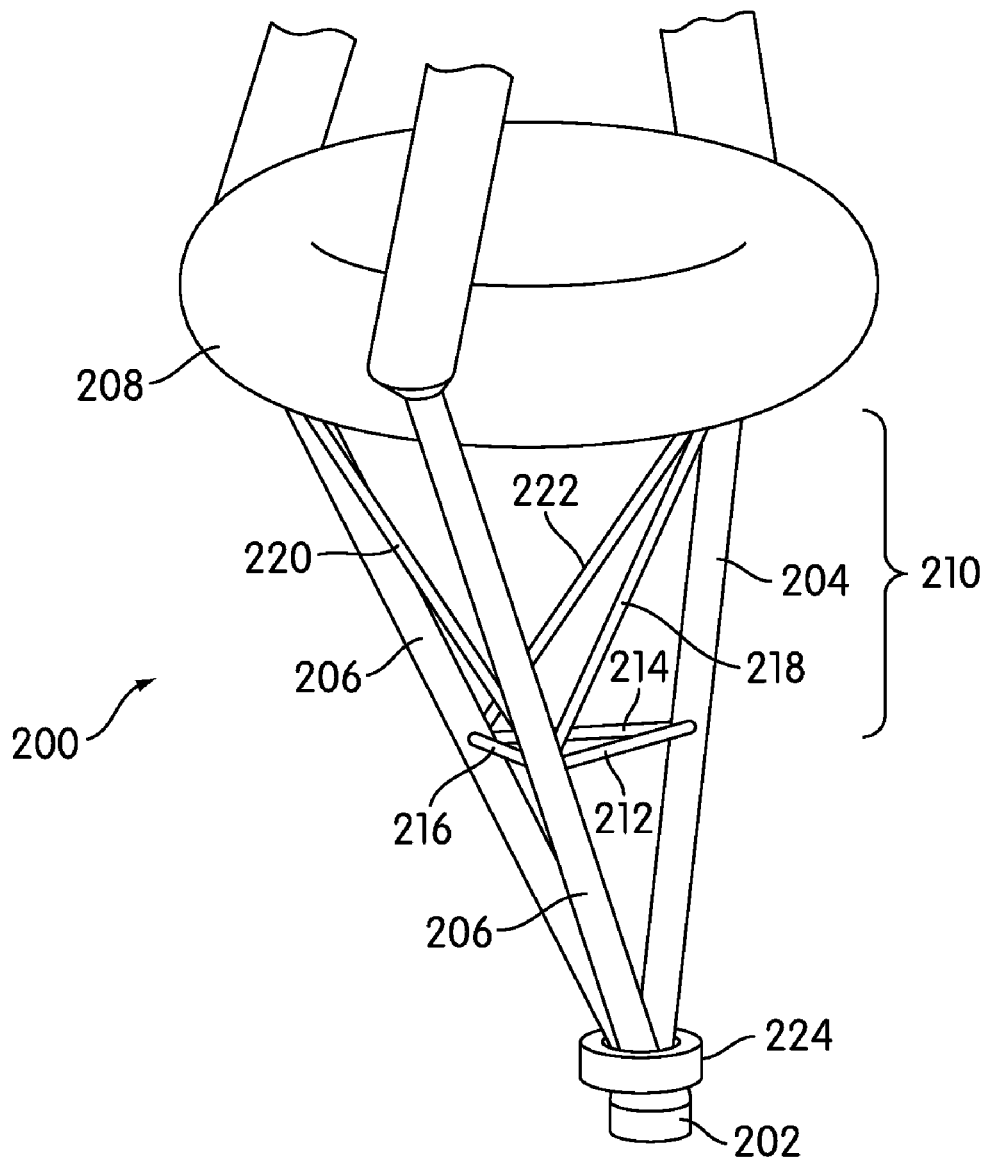
FIGS. 5-8 are perspective views of embodiments of the floating underwater support structure that may be used with progressively deeper water.

FIG. 5 is a perspective view of a floating underwater support structure, generally indicated at 200, for use in slightly deeper water (e.g., 40 m). The floating underwater support structure 200 includes an anchor mechanism 202, from which arise three legs, a fore leg 204 and two aft legs 206. Between the legs, and positioned 5-10 m (e.g., approximately 7 m) below the surface, is a buoyant member 208.

The floating underwater support structure 200 does include cross-bracing members, generally indicated at 210. Specifically, three cross-bracing members 212, 214, 216 extend between the three legs 204, 206 in about the same plane, forming a generally triangular shape about halfway between the anchor mechanism 202 and the buoyant member 208. In addition, a group of three diagonal cross-bracing members 218, 220, 222, extend upwardly along the diagonal between the legs 204, 206 from the position of the cross-bracing members 212, 214, 216 to the position at which the legs 204, 206 attach to the above-sea structure that they are supporting.

The cross-bracing members 212, 214, 216, 218, 220, 222 may have diameters of about one-third the diameter of the fore leg 204. For example, if the fore leg has a diameter of 1 m, the cross-bracing members 212, 214, 216, 218, 220, 222 may have diameters of 0.3 m. As with the other members, the cross-bracing members 212, 214, 216, 218, 220, 222 may be hollow tubes with wall thicknesses equal to about 10% of their radii.

The increased depth of the water and the presence of the cross-bracing members 212, 214, 216, 218, 220, 222 may allow a relative reduction in the dimensions of the legs 204, 206 relative to the legs 104, 106 of a shallower-water embodiment. For example, while the floating underwater support structure may have fore and aft leg 104, 106 diameters of 1 m and 0.8 m, respectively, the floating underwater support structure 200 may have fore and aft leg 204, 206 diameters of about 10% less.

FIG. 5 also illustrates the use of a ballast structure 224 placed at the apex of the truss. The ballast structure 224 of the illustrated embodiment is an annulus, although essentially any symmetrical shape may be used. It may be made of a material such as concrete or steel. Positioned as illustrated in FIG. 5, it reduces the tension on the anchor mechanism 202.

Figure 6:
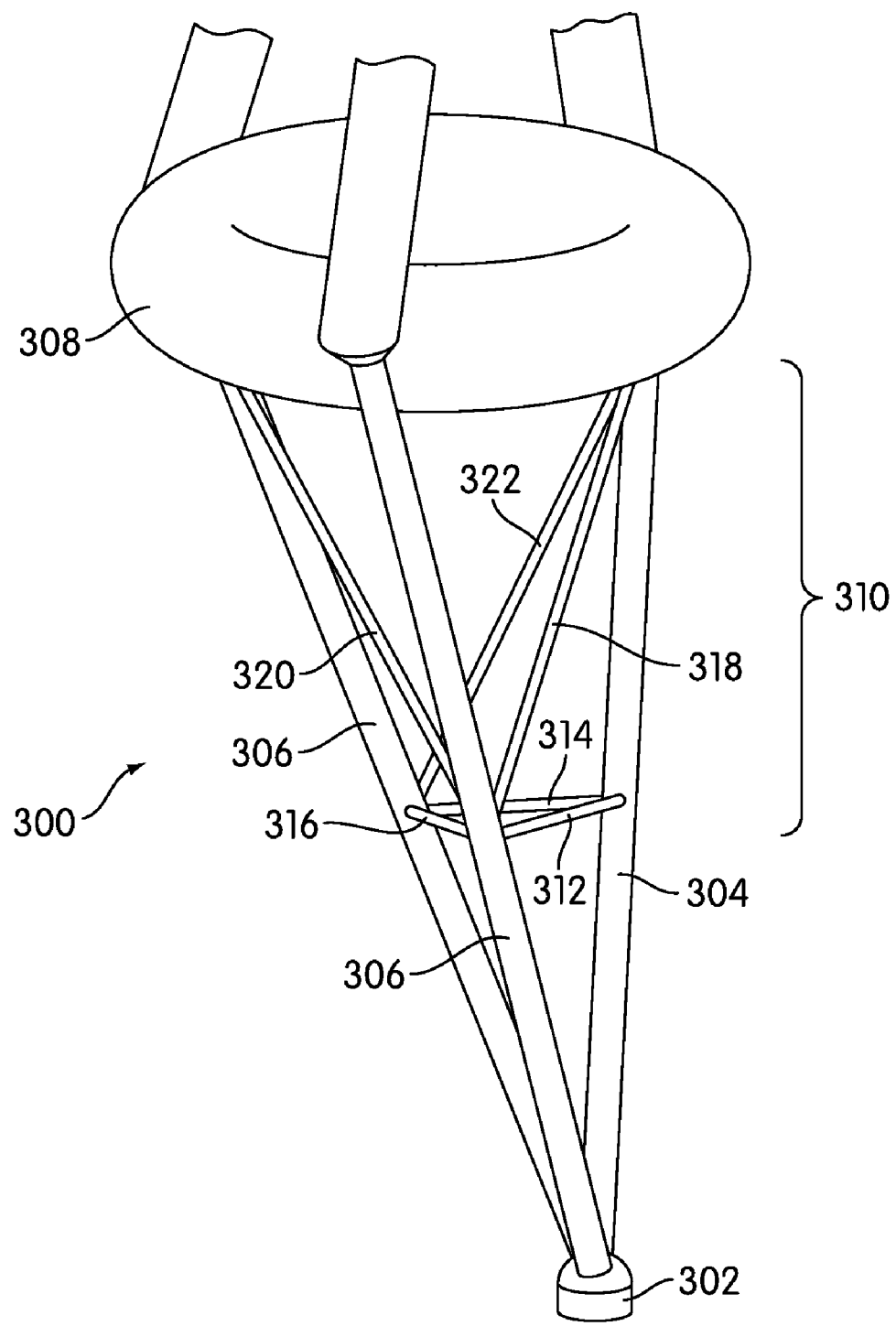

FIG. 6 is a perspective view of a floating underwater support structure, generally indicated at 300, for use in yet deeper water (e.g., 50 m). The floating underwater support structure 300 includes an anchor mechanism 302, from which arise three legs, a fore leg 304 and two aft legs 306. Between the legs, and positioned 5-10 m (e.g., approximately 7 m) below the surface, is a buoyant member 308.

The floating underwater support structure 300 also includes cross-bracing members, generally indicated at 310. Specifically, three cross-bracing members 312, 314, 316 extend between the three legs 304, 306 in about the same plane, forming a generally triangular shape about halfway between the anchor mechanism 302 and the buoyant member 308. In addition, a group of three diagonal cross-bracing members 318, 320, 322, extend upwardly along the diagonal between the legs 304, 306 from the position of the cross-bracing members 312, 314, 316 to the position at which the legs 304, 306 attach to the above-sea structure that they are supporting.

Relative to the floating underwater support structure 200 of FIG. 5, the floating underwater support structure 300 of FIG. 6 is more elongate. The essential configuration of the cross-bracing members is similar in both floating underwater structures 200, 300. However, because of the deeper water and the more elongate legs 304, 306, the leg diameters may be increased slightly relative to the floating underwater support structure 200 of FIG. 5. For example, the fore leg 304 may have a diameter of 1.02 m in one embodiment, and the aft members may have diameters of 0.80 m in one embodiment. The cross-bracing members 312, 314, 316, 318, 320, 322 may have about the same diameter as the cross-bracing members 212, 214, 216, 218, 220, 222 of FIG. 5.

Figure 7:
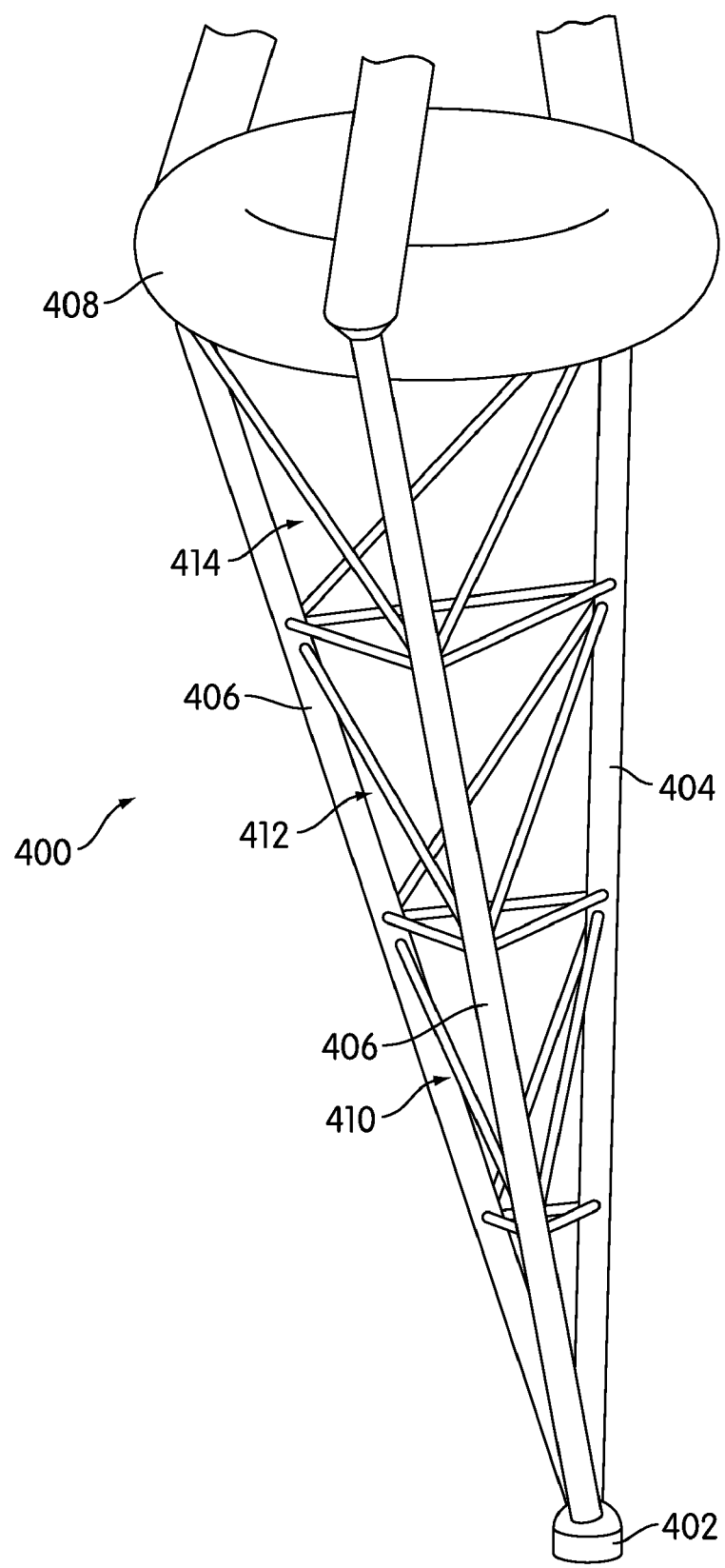

FIG. 7 is a perspective view of a floating underwater support structure, generally indicated at 400, for use in relatively deeper waters (e.g., 70 m). The floating underwater support structure 400 includes an anchor mechanism 402, from which arise three legs, a fore leg 404 and two aft legs 406. Between the legs, and positioned 5-10 m (e.g., approximately 7 m) below the surface, is a buoyant member 408.

The floating underwater support structure 400 has three sets of cross-bracing members, generally indicated at 410, 412, and 414. Each of the sets of cross-bracing members 410, 412, 414 includes a set of cross-bracing members that extend generally horizontally between the legs to form a triangle, and three members that extend diagonally upwardly, much like the bracing structure of the floating underwater support structures 200, 300 of FIGS. 5 and 6.

With deeper waters, the effects of the surface wind and waves are attenuated somewhat, and thus, the dimensions of the fore and aft legs 404, 406 may be slightly less than those of other embodiments. For example, in one embodiment, the fore leg 404 may have a diameter of 0.97 m and the aft legs 406 may have diameters of 0.74 m, respectively, with wall thicknesses that are about 10% of their radii.

At deep water depths, e.g., beyond 70-80 m, elongating the structure 400 of FIG. 7 is unlikely to add additional stability or rigidity to the structure. In other words, the weight of the floating underwater support structure will increase as additional members are added to it, but beyond a certain depth, the added weight and complexity may not be justified by whatever incremental increase in stability the additional length provides. Moreover, as the depth increases, members that can carry only tension become more practical.

Figure 8:
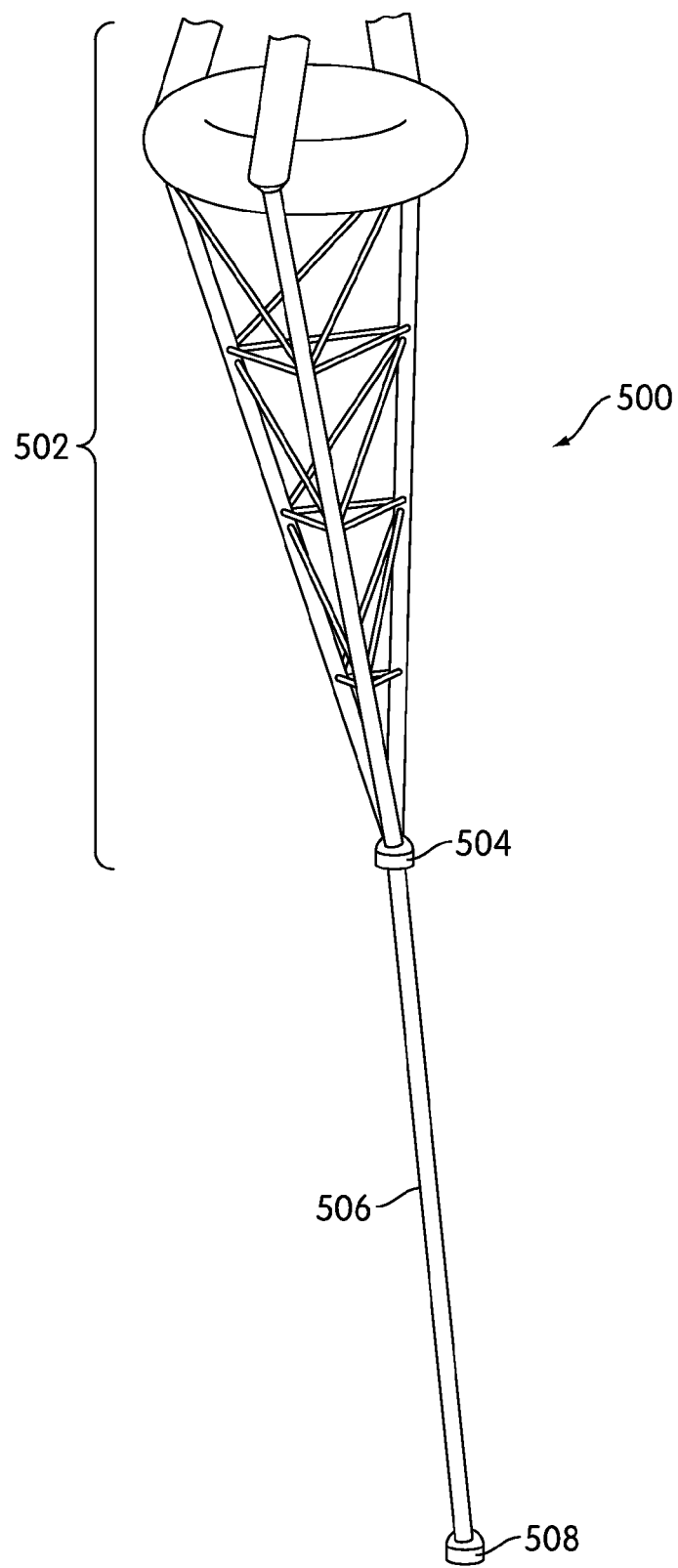

Therefore, for particularly deep water depths, a slightly different approach may be taken. FIG. 8 is a perspective view of a floating underwater support structure, generally indicated at 500, that is adapted for particularly deep water depths. The upper portion 502 of the floating underwater support structure 500, is essentially the same as the floating underwater support structure 400.

The bottom of the upper portion 502 of the floating underwater support structure 500 is provided with a joint mechanism 504 substantially similar to the anchor mechanisms 102, 202, 302, 402 of the other embodiments. The joint mechanism 504 allows rotation and pitch, roll, and yaw rotation. However, instead of being embedded in the floor of a body of water, the joint mechanism 504 is instead connected to a single tendon or connector member 506. The connector member 506 is connected to an anchor mechanism 508 that is embedded in the sea floor. The connector member 506 may be either flexible or rigid, and in some embodiments, it may include a joint or anchor mechanism on only one end.

The truss structure of the underwater support structure 500 still sustains tension loads and bending moments, creating a lever arm that reduces the force or tension required to keep the structure upright.

Figure 9:
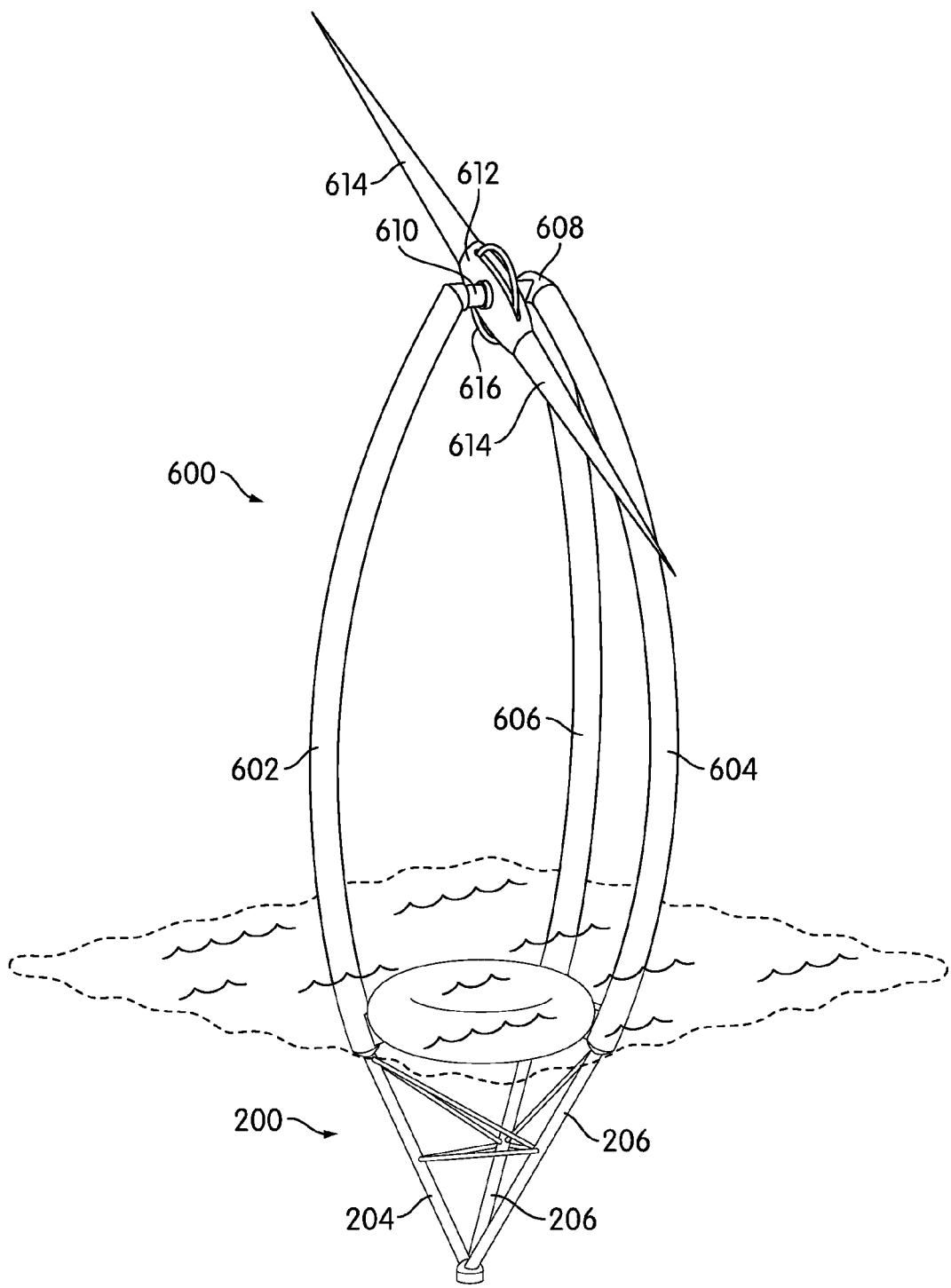
FIG. 9 is a perspective view of a floating underwater support structure according to an embodiment of the invention supporting another type of wind turbine.

As was described above, the floating underwater support structures of the present invention can be used to support a variety of structures. FIG. 9 is a perspective view of another type of wind turbine, generally indicated at 600, being supported by a floating underwater support structure 200.

Instead of a primary support member or tower supporting a hub with blades, the wind turbine 600 has three arcuate support members 602, 604, 606 that rise from the legs 204, 206 of the floating underwater support structure 200. Two of the support members 604, 606 meet at the top in a short horizontal bar 608. An axle 610 extends transversely between one of the support members 602 and the bar 608 that connects the other two legs 608. Mounted for rotation on the axle 610 is a hub 612, from which two blades 614 extend. Of course, in other embodiments, any number of blades may be used. The hub 612 of the illustrated embodiment carries a direct drive electrical generator 616, although any type of generator may be used.

As compared with a more traditional wind turbine 12, in the wind turbine 600, the blades 614 rotate through the space defined by the support members 602, 604, 606. In some embodiments, rather than having three support members 602, 604, 606, there may be only two, such that the hub 612 is mounted at the top of a support structure that has the general appearance of a flattened arch, and rotates orthogonally through the plane of the arch.

Therefore, as described above, floating underwater support structures 10, 100, 200, 300, 400, 500 according to embodiments of the invention attenuate the forces that an above-water structure would otherwise experience, while also allowing the structure to move with those forces, at least within a limited range of motion. Thus, they are particularly suitable for any structure that needs to remain above water, but that can tolerate some degree of leaning and movement. Examples of such structures include meteorological towers; substations that accept power from a number of wind turbines in a particular area; lighthouses and other navigational aids; bases for tethered balloons, aerostats, and heavier-than-air flying craft; and cellular or other communication towers. While they may permit more movement than some traditional support structures, such as TLPs, underwater support structures according to embodiments of the invention are also generally lighter and can be constructed at lower cost than those traditional support structures. Furthermore, as was set forth, embodiments of the invention can be constructed for essentially any water depth, ranging from shallow to deep.

Figure 10:
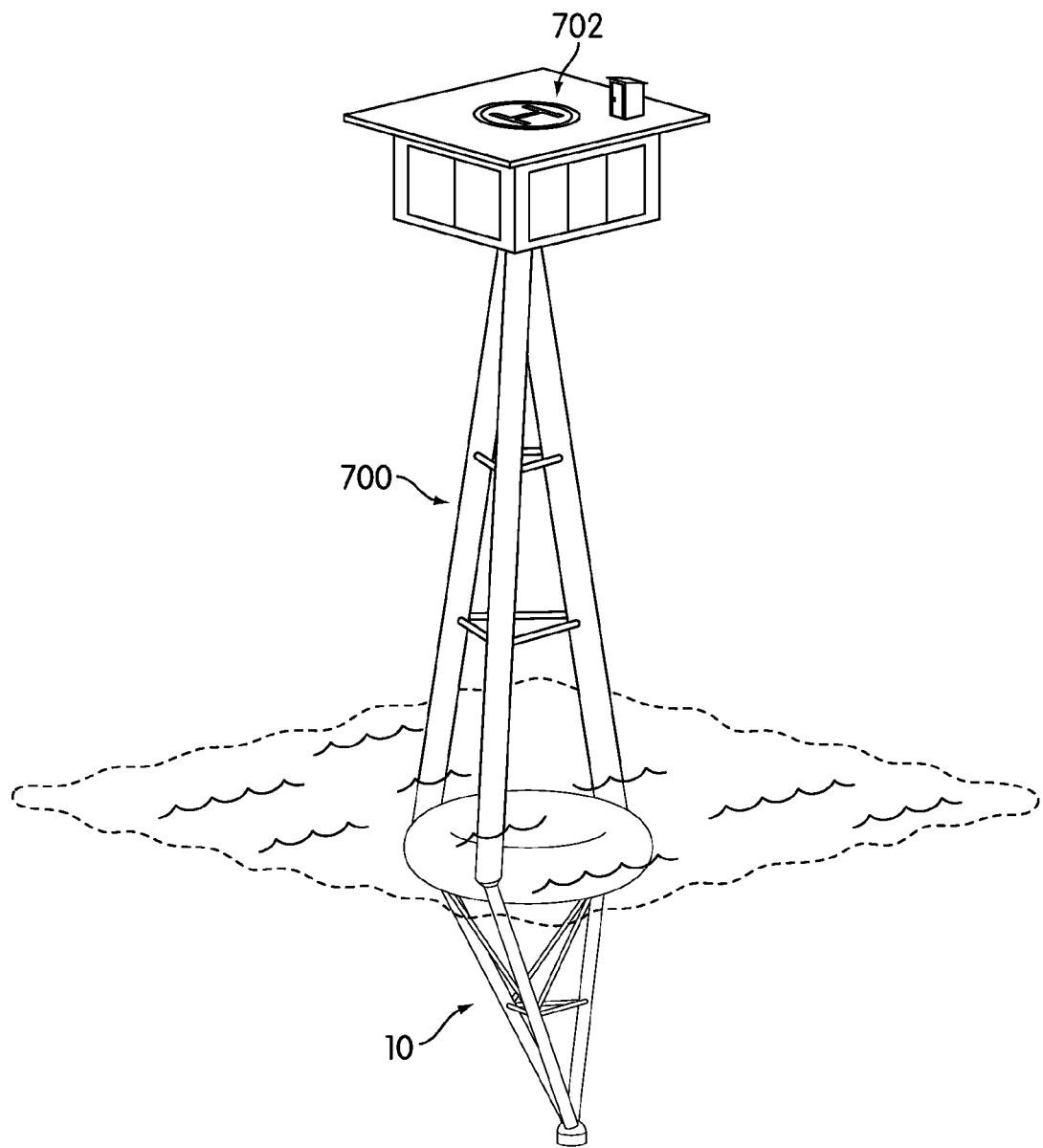
FIG. 10 is a perspective view of a floating underwater support structure according to another embodiment of the invention supporting a different type of sea structure.

FIG. 10 illustrates yet another type of structure that may be mounted on a floating underwater support structure 10. More specifically, a tower 700 is mounted on a floating underwater support structure 10. At the top of the tower 700 is a helicopter refueling station 702.

In the above description, each of the floating underwater support structures 10, 100, 200, 300, 400, 500 had a truss structure with three main members or legs. However, embodiments of the invention may have any number of legs, including a single leg. For example, there may be embodiments in which a floating underwater support structure with four legs is lighter and more advantageous than a comparable floating underwater support structure with three legs. In other embodiments, two legs may be sufficient to carry the anticipated loads. In yet other embodiments, 4-8 legs may be provided. The number of legs that are used in any particular situation, and the overall arrangement of the truss structure, will depend upon the type of structure to be supported, the expected loads, and other conventional considerations.

While the invention has been described with respect to certain embodiments, those embodiments are intended to be exemplary, rather than limiting. Modifications and changes may be made within the scope of the invention, which is defined by the following claims.

What is claimed is:

1. A buoyant underwater support structure assembly constructed and adapted to be located within a body of water, comprising:
a generally elongated truss structure that is able to sustain loads in tension, compression, and bending and that is constructed from one or more elongate, rigid members that are each able to sustain loads in at least tension and compression;
a joint member that is attached to the truss structure at a lowermost portion thereof, the joint member being anchored directly to the floor of the body of water and being the sole means by which the floating underwater support structure assembly is secured to the floor of the body of water, the joint member being constructed and adapted to permit only angular movement about two or three axes;
a buoyant member that is arranged between or around the one or more elongate, rigid members and that is connected to them, the buoyant member supplying a buoyant force greater than at least the combined weight of the floating underwater support structure assembly and a weight supported by the floating underwater support structure assembly so as to maintain the assembly in a generally upright configuration extending upwardly from the joint member; and
a liquid-fillable mobile ballast member or a solid mobile ballast member;
wherein the buoyant member and the truss structure are proportioned and arranged relative to one another such that the top of the buoyant member rests a predefined distance below water level.

2. The buoyant underwater support structure assembly of claim 1, wherein the joint member has a range of about 90° in each of pitch and roll, and a range of about 360° in yaw.

3. The buoyant underwater support structure assembly of claim 1, wherein the joint member comprises a universal joint or a ball joint.

4. The buoyant underwater support structure assembly of claim 3, wherein the joint member comprises a universal joint and further comprises a rotational bearing mounted to the universal joint.

5. The buoyant underwater support structure assembly of claim 1, wherein the truss structure comprises three or more elongate, rigid members capable of sustaining loads in tension, compression, and bending, the three or more members forming an inverted pyramid or frustum.

6. The buoyant underwater support structure assembly of claim 5, wherein the three or more members are generally tubular members of circular cross-section.

7. The buoyant underwater support structure assembly of claim 6, wherein one of the three or more members has a greater diameter than others of the three or more members.

8. The buoyant underwater support structure assembly of claim 1, wherein the buoyant member has a generally symmetrical shape.

9. The buoyant underwater support structure assembly of claim 8, wherein the buoyant member has a general shape of a torus.

10. The buoyant underwater support structure assembly of claim 1, wherein the truss structure is comprised of three or more elongate, rigid members and further comprises at least one unit of cross-bracing between the three or more members, each unit of cross-bracing including:
a first set of cross-bracing members that extend between the three or more members in essentially the same plane; and
a second set of cross-bracing members that extend between the three or more members, each of the second set extending from one of the members at or near the plane of the first set of cross-bracing members diagonally upwardly to an adjacent one of the members.

11. The buoyant underwater support structure assembly of claim 1, wherein the buoyant member has a track disposed therein and the mobile ballast member is repositionable along the track.

12. The buoyant underwater support structure assembly of claim 1, wherein the position of the mobile ballast member is laterally and controllably variable.

13. The buoyant underwater support structure assembly of claim 1, further comprising ballast placed on a low point of the truss structure so as to reduce load on the joint member.

14. A floating, wind energy generating structure constructed and adapted to be located within a body of water, comprising:
- a wind turbine; and
- a buoyant underwater support structure assembly connected to and supporting the wind turbine such that the wind turbine extends generally vertically from the buoyant underwater support structure assembly, the buoyant underwater support structure assembly comprising
  - a generally elongated truss structure that is able to sustain loads in tension, compression, and bending and that is constructed from one or more elongate, rigid members that are each able to sustain loads in at least tension and compression,
  - a joint member that is attached to the truss structure at a lowermost portion thereof, the joint member being anchored directly to the floor of the body of water and being the sole means by which the floating underwater support structure assembly is secured to the floor of the body of water, the joint member being constructed and adapted to permit only angular movement about two or three axes,
  - a buoyant member that is arranged between or around the one or more elongate, rigid members and that is connected to them, the buoyant member supplying a buoyant force greater than at least the combined weight of the floating underwater support structure assembly and a weight supported by the floating underwater support structure assembly so as to maintain the assembly in a generally upright configuration extending upwardly from the joint member, and
  - a ballast system constructed and arranged to controllably change at least a lateral position of a ballast mass,
  - wherein the buoyant member and the truss structure are proportioned and arranged relative to one another such that the top of the buoyant member rests a predefined distance below water level; and
- one or more tension cable supports connected between the buoyant member at a lower end of an above-water support portion of the wind turbine and an upper end of the above-water support portion.

15. The floating, wind energy generating structure of claim 14, wherein the joint member has a range of about 90° in each of pitch and roll, and a range of about 360° in yaw.

16. The floating, wind energy generating structure of claim 14, wherein the joint member comprises a universal joint or a ball joint.

17. The floating, wind energy generating structure of claim 14, wherein the truss structure comprises three or more elongate, rigid members capable of sustaining loads in tension, compression, and bending, the three or more members forming an inverted pyramid or frustum.

18. The floating, wind energy generating structure of claim 14, wherein the buoyant member comprises a liquid-filled mobile ballast member or a solid mobile ballast member.

19. The floating, wind energy generating structure of claim 18, wherein the buoyant member has a track disposed therein and the ballast member comprises a mass that is repositionable along the track.

20. A floating, wind energy generating structure constructed and adapted to be located in a body of water, comprising:
- a wind turbine including a plurality of above-water support members connected to a buoyant underwater support structure assembly, the buoyant underwater support structure assembly comprising
  - a generally elongated truss structure that is able to sustain loads in tension, compression, and bending and that is constructed from a plurality of elongate, rigid members that are each able to sustain loads in at least tension and compression, the plurality of elongate, rigid members corresponding in location and number with the plurality of wind turbine support members and being attached thereto,
  - a joint member that is attached to the truss structure at a lowermost portion thereof, the joint member being anchored directly to the floor of the body of water and being the sole means by which the floating underwater support structure assembly is secured to the floor of the body of water, the joint member being constructed and adapted to permit only angular movement about two or three axes,
  - a buoyant member having a generally symmetrical shape about a generally vertically-extending axis of rotation of the truss structure that is arranged between or around the one or more elongate, rigid members and that is connected to them, the buoyant member supplying a buoyant force greater than at least the combined weight of the floating underwater support structure assembly and a weight supported by the floating underwater support structure assembly so as to maintain the assembly in a generally upright configuration extending upwardly from the joint member, and
  - a ballast system constructed and arranged to controllably change at least a lateral position of a ballast mass; and
- the wind turbine further comprising
  - an axle defined on or by at least one of the above-water members,
  - a hub mounted for rotation on the axle, and
  - two or more blades mounted on the hub, the blades being constructed and arranged such that the blades translate forces exerted by wind into rotation of the hub, and
  - a generator mounted on or coupled to the hub to convert rotation of the hub into electrical energy;
  - wherein the buoyant member and the truss structure are proportioned and arranged relative to one another such that the top of the buoyant member rests a predefined distance below water level.

21. The floating, wind energy generating structure of claim 20, wherein the generator comprises a direct drive generator mounted on the axle for 1:1 rotation with the hub.

* * * * *